(12) United States Patent
Jain et al.

(10) Patent No.: US 9,237,323 B2
(45) Date of Patent: Jan. 12, 2016

(54) MEDIA RENDERING DEVICE PROVIDING UNINTERRUPTED PLAYBACK OF CONTENT

(75) Inventors: Vikas Jain, Bangalore (IN); Manu Dhundi, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/009,813

(22) PCT Filed: Apr. 3, 2012

(86) PCT No.: PCT/IB2012/051620
§ 371 (c)(1),
(2), (4) Date: Oct. 4, 2013

(87) PCT Pub. No.: WO2012/140541
PCT Pub. Date: Oct. 18, 2012

(65) Prior Publication Data
US 2014/0023337 A1    Jan. 23, 2014

(30) Foreign Application Priority Data
Apr. 11, 2011   (EP) ..................................... 11161873

(51) Int. Cl.
*H04N 5/775*    (2006.01)
*H04N 9/87*     (2006.01)
*H04L 12/28*    (2006.01)

(52) U.S. Cl.
CPC .............. *H04N 9/87* (2013.01); *H04L 12/2821* (2013.01)

(58) Field of Classification Search
CPC ............ H04N 21/4622; H04N 9/8227; H04N 9/8205; H04N 5/765; H04N 5/91; H04N 5/775; H04N 21/482
USPC ................................... 386/230, 353, 354, 356
See application file for complete search history.

(56) References Cited

U.S. PATENT DOCUMENTS

| 6,243,707 B1 * | 6/2001 | Humpleman | H04L 12/2805 1/1 |
| 6,378,129 B1 * | 4/2002 | Zetts | 725/94 |

(Continued)

FOREIGN PATENT DOCUMENTS

EP    1777883 A1    4/2007

OTHER PUBLICATIONS

Mukhtar et al: "Session Mobility of Multimedia Applications in Home Networks Using UPnP"; IEEE, 2007, pp. 1-6.

(Continued)

*Primary Examiner* — Helen Shibru

(57) ABSTRACT

A method of providing uninterrupted playback of content being rendered by a media rendering device (102a) in a home network (100) is disclosed. The method comprises retaining (202) the media rendering device (102a) within the home network and checking whether the media rendering device is rendering content and if so checking (204) whether the media rendering device wants to continue its current ongoing rendering of content uninterruptedly and if so configuring (206) the media rendering device to notify the plurality of controller devices not to subscribe and invoke rendering service request thereby suspending the processing of rendering service request. The rendering devices could be connected televisions, streamium devices, connected photo frames, set-top-boxes, mobile phones and personal computers/laptops within the home network. The disclosed method could help the media rendering device and controller devices to save on power and network traffic.

9 Claims, 3 Drawing Sheets

(56) References Cited

U.S. PATENT DOCUMENTS

| | | | |
|---|---|---|---|
| 6,597,374 B1* | 7/2003 | Baker | H03J 1/0025 345/173 |
| 6,690,392 B1* | 2/2004 | Wugoski | 715/744 |
| 7,243,132 B2* | 7/2007 | Choi | 709/208 |
| 2004/0208319 A1* | 10/2004 | Hursey | 380/202 |
| 2006/0014534 A1 | 1/2006 | Costa-Requena et al. | |
| 2008/0098450 A1* | 4/2008 | Wu et al. | 725/132 |
| 2008/0235620 A1 | 9/2008 | Musschebroeck et al. | |
| 2009/0256626 A1 | 10/2009 | Hsieh et al. | |
| 2010/0052901 A1 | 3/2010 | Szucs | |
| 2010/0095332 A1 | 4/2010 | Gran et al. | |
| 2010/0146138 A1* | 6/2010 | Ng et al. | 709/231 |
| 2011/0271236 A1* | 11/2011 | Jain | 715/863 |
| 2012/0158984 A1* | 6/2012 | Maitre et al. | 709/231 |
| 2013/0097626 A1* | 4/2013 | Rajagopal et al. | 725/25 |
| 2013/0132525 A1* | 5/2013 | Tippin | 709/219 |

OTHER PUBLICATIONS

"Universal Plug and Play"; UPnP Forum. Internet Blog, Downloaded From http://tripatlas.com/Universal_Plug_and_Play, on Nov. 18, 2010. 8 Page Document.

Shin et al: "User-Centric Conflict Management for Media Services Using Personal Companions"; ETRI Journal, vol. 29, No. 3, Jun. 2007, pp. 311-321.

Thyagaraju et al: "Conflict Resolution in Multiuser Context-Aware Environments"; IEEE Conference on Computational Intelligence for Modelling Control & Automation, 2008, pp. 332-338.

* cited by examiner

MEDIA RENDERING DEVICE PROVIDING UNINTERRUPTED PLAYBACK OF CONTENT

CROSS-REFERENCE TO PRIOR APPLICATIONS

This application is the U.S. National Phase application under 35 U.S.C. §371 of International Application No. PCT/IB201/051620, filed on Apr. 3, 2012, which claims the benefit of or European Patent Application No. 11161873.2, filed on Apr. 11, 2011. These applications are hereby incorporated by reference herein.

FIELD OF THE INVENTION

The present invention generally relates to the field of media rendering devices and more specifically to the field of providing uninterrupted playback of content being rendered by a media rendering device in a home network.

BACKGROUND OF THE INVENTION

Patent application US2008/0235620 discloses a control device for control of a system with a renderer and multiple sources supplying content to the renderer. The control device controls switching the system from a first activity to a second activity upon detecting a validating user interaction with the user interface to validate the switching. This could result in interruption of the current ongoing playback at the renderer.

As an exemplary situation, a renderer device such as a television could be rendering audio/video content either from Internet source or USB source or DLNA media server. A controller device could interrupt the television's playback requesting to play content from other content source (e.g., from Blu-ray Disc player or from Personal Comptuer (PC) present in the home network). This could force the television to stop the playback of the current content and switch to the controller device's instructed content source (e.g., from Blu-ray Disc player or from PC present in the home network). This could result in interruption of the current ongoing playback at the television. This problem could be much more when the home network has multiple controllers to control the television.

SUMMARY OF THE INVENTION

Accordingly, it is an object of the present invention to provide a method for uninterrupted playback of content being rendered by a media rendering device in a home network. The present invention is defined by the independent claims. The dependent claims define advantageous embodiments.

The object of the present subject matter is realized by providing a method for uninterrupted playback of content being rendered by a media rendering device in a home network, the media rendering device configured to render content available from a plurality of content sources, the home network having a plurality of controller devices to control the media rendering device, the method comprising:

retaining the media rendering device within the home network and checking whether the media rendering device is rendering content and if so checking whether the media rendering device wants to continue its current ongoing rendering of content uninterruptedly and if so configuring the media rendering device to notify the plurality of controller devices not to subscribe and invoke rendering service request thereby suspending the processing of rendering service request.

Media rendering devices in a home network generally support playback from multiple content sources. The content sources could be but not limited to i) a USB source ii) an Internet source iii) a tuner iv) High-Definition Multimedia Interface (HDMI) source and v) Digital Living Network Alliance (DLNA) source.

DLNA/UPnP has a mechanism wherein a controller device can push its request requesting the DLNA server content to be played via Audio Video Transport (AVT) service. Further, the playback could be controlled via AVT and Rendering Control Services (RCS). This could interrupt the current ongoing playback. This could mean that the media rendering device has to stop the playback of the current selected source's content and switch to the controller device instructed content source. This problem could be much more when there are multiple controller devices within the home network.

A use-case scenario about interruption of the playback could be that a user is watching breaking news over television and a controller device (e.g., kids controller device) interrupts the playback (even though kids might be doing it playfully only).

A further use-case scenario could be that user A is viewing content on a media rendering device. User B's controller device tries to remotely control the media rendering device and interrupts to perform recording of a program. The problem could be much more if user C's controller device also tries to remotely control the media rendering device and interrupts to perform recording of a program.

A still further use-case scenario could be that an audio rendering device is playing content in room A. A controller device is room B tries to control the volume of the audio rendering device in room A. This could be because the user in room B might need more volume. User in room A may not like to change it to a higher volume level.

A still further use-case scenario could be that an audio rendering device is playing content via 2 speakers namely speaker 1 placed in room A and speaker 2 placed in room B. A controller device in room A and a controller device in room B tries to control the playback of the content simultaneously which may be undesirable.

To summarize, there could be an interruption of currently ongoing playback which users may not appreciate. Hence, there is a need for the media rendering device to request controller devices not to push their request when the media rendering device wants to continue its current ongoing playback uninterruptedly.

It is not possible for the media rendering device to allow only certain controller devices to send rendering service requests thereby supporting priority/ranking within the controller devices.

Further, there is wastage of network traffic as the media rendering device has to continuously inform about i) events ii) receiving subscription requests and subscription renewal requests towards all the controller devices within the home network. This in turn could amount to wastage of processing power (e.g. the frequency of subscription and the subscription renewal from a single controller is approximately 15 seconds).

The disclosed method enables the media rendering device to notify all or some of the controller devices, not to invoke any rendering service request, prior to any controller device invoking a rendering service request. Further, the disclosed method could disable the processing of rendering service requests temporarily on the media rendering device within the home network. This allows the ongoing playback to continue without interruption. The media rendering device is retained within the home network and is recognized as a media rendering device. Retaining the media rendering device within the home network has the following advantages:
1. All the controller devices within the home network would know that a media rendering device is present in the home network. Hence, there is no overhead of re-discovery of the media rendering device by the controller devices.
2. Providing different levels of configurability to controller devices.

In an embodiment, the media rendering device temporarily disables the rendering service request associated with A/V playback controls of UPnP Audio/Video transport (AVT) service. This embodiment allows configurability. The configurability could be in terms of providing different levels of disabling of the rendering services within the home network. This could allow disabling of A/V playback controls of UPnP AVT services but could allow enabling of volume/mute controls of UPnP Rendering Control Services (RCS).

Further, the media rendering device could temporarily disable the rendering service request associated with setting of a new URL within AVT service. This could allow further configurability. This could allow enabling of play/pause/stop within AVT service but could disable setting of a new URL within the AVT service.

Furthermore, the media rendering device could temporarily disable the rendering service request associated with the rendering of content from a pre-determined content source while the rendering is ongoing. This provides further configurability (e.g., disabling could be enforced while the Internet content is being watched whereas it could be enabled while the USB content is being watched).

In a still further embodiment, the media rendering device temporarily disables the rendering service requests invoked by specific controller devices thereby allowing prioritization. This embodiment allows disabling the rendering services towards specific controller devices within the home network thereby prioritizing the media rendering device across different controller devices. The media rendering device could temporarily disable the rendering service request invoked by at least one of:
controller device used by kids
controller device used by guests
controller device used by spouse This could allow still further configurability. The controller device used by kids would not be allowed to interrupt the current ongoing playback while spouse controller device could be allowed to control the current ongoing playback. Further, guest controller devices would not be allowed to interrupt the current ongoing playback.

In a still further embodiment, the media rendering device may check whether rendering service request invoked by a first controller device has been processed and if so prioritize the first controller device and temporarily disable the processing of rendering service request invoked by controller devices other than the first controller device. This embodiment provides further configurability to configure and prioritize the controller devices.

In a still further embodiment, the media rendering device uses an event mechanism and notifies one or more controller devices that the processing of rendering service request is temporarily disabled. This embodiment could result in disallowing the controller device to subscribe for events associated with specific rendering service (e.g., while the time suspension is enforced). This could save on the home network traffic and the processing power.

In a still further embodiment, each controller device transmits unique identification information to the media rendering device thereby facilitating temporary disabling of the rendering service on the corresponding controller device.

In a still further embodiment, powering on the media rendering device enables the temporarily disabled rendering services. Power ON/Off need not necessarily mean ON/OFF of the media rendering device. ON/OFF could be only for the renderer component of the media rendering device which is a software. As an example, media rendering device ON/OFF could just be ON/OFF of an executable running on a PC. This embodiment could allow further configurability. The user could have a setting to automatically enable the rendering services when the playback is over for a particular content. Furthermore, the user could be presented an user interface on the media rendering device to view the list of controller devices within the home network. The user could be allowed to check/un-check disabling of the rendering services for each of the controller device.

In a further object of the present subject matter a logic unit for providing uninterrupted playback of content being rendered by a media rendering device in a home network is disclosed. The media rendering device is configured to render content available from a plurality of sources. The logic unit comprises:
a retaining unit for retaining the media rendering device within the home network and checking whether the media rendering device is rendering content;
a checking unit for checking whether the media rendering device wants to continue its current ongoing rendering uninterruptedly; and
a configuring unit for configuring the media rendering device to notify the plurality of controller devices not to subscribe and invoke rendering service request thereby suspending the processing of rendering service request.

In a still further object of the present subject matter a home network comprising a logic unit for providing uninterrupted playback of content being rendered by a media rendering device is disclosed.

BRIEF DESCRIPTION OF THE DRAWINGS

The above-mentioned aspects, features and advantages will be further described, by way of example only, with reference to the accompanying drawings, in which the same reference numerals indicate identical or similar parts, and in which.

DETAILED DESCRIPTION OF THE EMBODIMENTS

Figure 1:
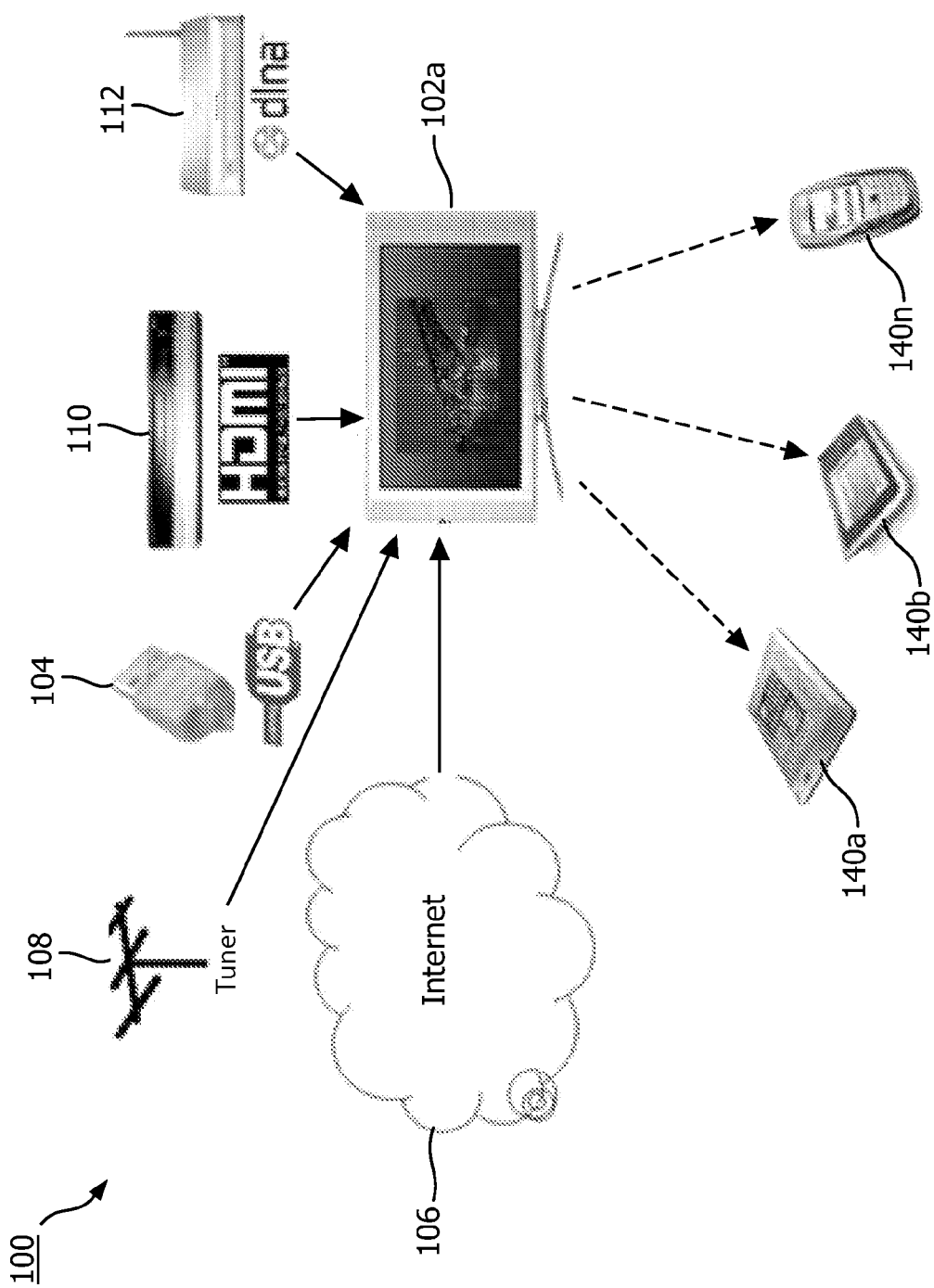
FIG. 1 shows an exemplary configuration of a home network according to an embodiment of the present subject matter.

Referring now to FIG. 1, a home network 100 is a residential local area network. It is generally used for communication between digital devices typically deployed in the home. An important function of the home network 100 is the sharing of Intranet access. A home server could be added for increased functionality. The home network 100 may use wired or wireless technology.

The home network 100 includes a television 102a as a media rendering device. The television 102a is configured to offer rendering services and support playback from different content sources.

The content sources could be
i) a USB source 104
ii) Internet source 106
iii) tuner source 108
iv) HDMI source 110
v) DLNA source 112

A plurality of controller devices 140a, 140b, 140c, ... 140n are configured to control the television 102a.

The UPnP (http://upnp.org/sdcps-and-certification/standards) which is defined by a protocol of the standard network architecture, is one of the major standard technologies of the home network. A UPnP-based home network system includes a plurality of UPnP devices for providing services, and a control point for controlling the plurality of UPnP devices. The UPnP devices notify their events to the control point.

The home network system for controlling the UPnP-based audio/video devices includes a media server for providing media contents through the home network, a media renderer for playing the media contents provided through the home network, and a control point for controlling the media server and the media renderer.

The control point obtains state information of the media server and the media renderer through events. For example, when the media server and the media renderer provide Audio/Video transport service and Rendering control service, if the media server and the media renderer put changed state variables into 'LastChange" state variable table, the changed state variables are transmitted to the control point after a predetermined time. Thus, the control point is informed of the current states of the devices.

The media server notifies information on the media contents to the control point in every UPnP action. Also, the media server transmits the corresponding media contents to the media renderer by streaming to play the media contents. The media renderer plays the media contents. The streaming method can be selected from various known methods.

UPnP/DLNA has a mechanism wherein a controller device 140a can push its request requesting the DLNA server content to be played via AVT service. Further, the playback could be controlled via AVT and Rendering Control Services (RCS). This could interrupt the current ongoing playback being played by the television 102a. This could mean that the television 102a has to stop the playback of the current selected source's content (e.g. Internet source 106) and switch to the controller device 140a instructed content source. This problem could be much more when there are multiple controller devices (i.e. 140b, 140c ... 140n) within the home network 100.

A use-case scenario about interruption of playback could be that a user is watching breaking news over the television 102a. The content source being the tuner 108. A controller device 140c (e.g. a kids controller) interrupts the playback (even though kids might be doing it playfully only).

A further use-case scenario could be that user A is viewing content on the television 102a. User B's controller device (e.g., 140d) tries to remotely control the television and interrupts the viewing of the content. The problem could be much more if user C's controller device (e.g., 140e) also tries to remotely control the television and interrupts the viewing of the content.

There is an interruption of currently ongoing playback which the user would not appreciate. Hence, there is a need for the television 120a to request the controller devices 140a, 140b, 140c, ... 140n not to push their request when the television wants to continue its current ongoing playback uninterruptedly.

It is not possible for the television to allow only certain controller devices to send rendering service requests thereby supporting priority/ranking within the controller devices.

Further, there is wastage of network traffic as the television has to continuously inform about i) events ii) receiving subscription requests and subscription renewal requests towards all the controller devices 140a, 140b, 140c, 140d, 140e, ... 140n within the home network 100. This in turn could result in wastage of processing power (e.g. the frequency of subscription and the subscription renewal from a single controller is approximately 15 seconds).

Figure 2:
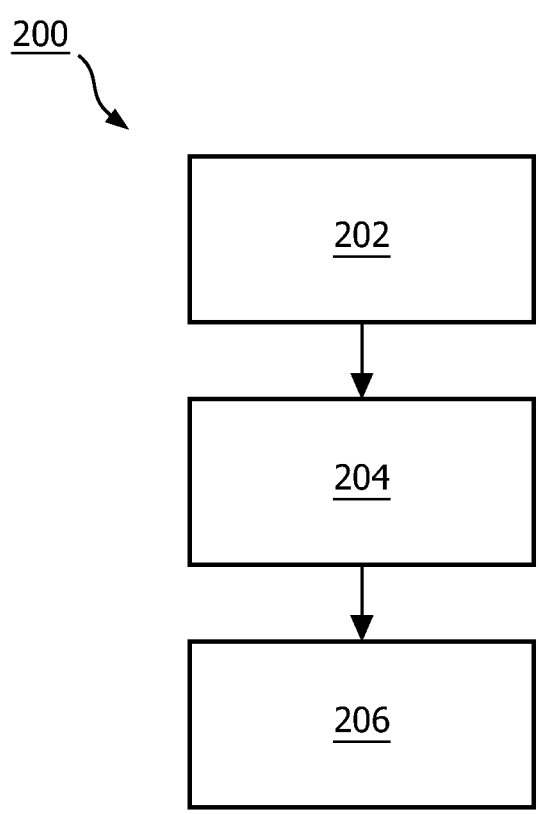
FIG. 2 schematically shows an exemplary flowchart illustrating the method of providing uninterrupted playback according to an embodiment of the present subject matter.

Referring now to FIG. 2, the idea behind the disclosed method is to notify the controller devices not to subscribe and invoke rendering service request to be processed by the media rendering device. This allows ongoing playback to continue without interruption. Further, the media rendering device is retained within the home network and is recognized as a media rendering device.

The method comprises a step 202 of retaining the television 102a within the home network 100 and checking whether the television 102a is rendering content.

In case the television 102a is rendering content, in step 204 check is carried out to ascertain whether the media rendering device wants to continue its current ongoing rendering of content uninterruptedly.

Then in step 206 the television 102a is configured to notify the controller devices 140a, 140b, ... 140n not to subscribe and invoke rendering service request to be processed by the media rendering device thereby suspending the processing of rendering service request. This allows the television 102a to provide uninterrupted playback of content.

One way of implementing the disclosed method could be as follows:

The last event sent by the television 102a to the controller device (e.g., 140a) could have additional state variable called Suspended State Information Per Service. Once this variable is set, the controller device (e.g., 140a) would know that this service is not available anymore. Henceforth, the controller device (e.g., 140a) could stop getting any last event for the suspended period and also the controller device (e.g., 140a) could stop subscribing for the service. Once the service is not in suspension state anymore then this variable could be cleared and the last event could be again sent to the controller device (e.g., 140a). It would also be possible for the controller device (e.g., 140a) to query the suspension state per service.

It could also be possible to disable specific actions within the rendering services temporarily for providing uninterrupted playback. This could mean that there could be suspended state information per action per service. This information could be queried by the controller device (e.g., 140a). The television 102a could inform the controller device (e.g., 140a) via the last change event.

It could be possible to save power, network traffic and processing of events. The television 102a could inform the controller device 140a about the suspension of the service which could result in dis-allowing the controller device 140a to subscribe to events for the specific service while the time suspension is enforced. The television 102a could continue to send the notifications e.g., every 15 minutes (which is not heavy on the network) to the controller device 140a so that the television 102a is still listed as a media rendering device in the controller device 140a. At the same time, the television 102a could not bother to send any events/updates to the controller device 140b, 140c, ... 140n for which the service has been suspended. This mechanism enables saving the network traffic and hence the power on the television 102a. This could also result in power saving on the controller device 140a as the number of events could come down.

In an embodiment, the television 102a could temporarily disable the rendering service request associated with A/V playback controls of UPnP AVT service. This allows configurability. This could enable providing different levels of disabling of the rendering services within the home network. This could allow disabling of AV playback controls of UPnP AVT services but could allow enabling of volume/mute controls of UPnP Rendering Control Services.

The television 102a could temporarily disable the rendering service request associated with setting of a new URL within AVT. This could enable play/pause/stop within AVT service but could disable setting of a new URL within the AVT service.

The television 102a could temporarily disable the rendering service request associated with rendering of content from a pre-determined content source while the rendering is ongoing. This could provide further configurability (e.g., disabling could be enforced while the Internet content is being watched whereas it could be enabled while the USB content is being watched).

In a further embodiment, the television 102a could temporarily disable the rendering service requests invoked by specific controller devices thereby allowing prioritization. This could allow disabling the rendering services towards specific controller devices within the home network thereby prioritizing media rendering devices across different controller devices.

One option could be to introduce a state variable capturing the list of available/allowed actions for a controller device. It could be possible to disable services/actions temporarily towards specific controller devices for providing uninterrupted playback. The television 102a could internally maintain the list of controller devices 140a, 140b, . . . 140n, the list of services and the list of actions that it wants to process (or respond). This could enable prioritization of services towards controller devices and also enable personalization towards different controller devices by (dis) allowing specific actions and services.

The television 102a could temporarily disable the rendering service request invoked by at least one of:
controller device used by kids
controller device used by guests
controller device used by spouse This allows still further configurability. The controller device used by kids would not be allowed to interrupt the current ongoing playback while spouse controller device could be allowed to control the current ongoing playback. Further, guest controller devices would not be allowed to interrupt the current ongoing playback.

In a still further embodiment, the television 102a checks whether rendering service request invoked by a first controller device (e.g., 140a) has been processed and if so prioritizes the first controller device (e.g., 140a) and temporarily disables the processing of rendering service request invoked by controller devices other than the first controller device (e.g., 140b, 140c, 140d, . . . 140n) This provides further configurability to configure and prioritize the controller devices 140a, 140b, 140c, . . . 140n.

In a still further embodiment, the television 102a could use an event mechanism and notify one or more controller devices 140a, 140b that the processing of rendering service request is temporarily disabled. This could result in dis-allowing the controller device to subscribe for events associated with specific rendering service (e.g., while the time suspension is enforced). This could save on the home network traffic thereby saving processing power.

There could be various possibilities for the television 102a to decide upon the triggering of the disabling mechanism and duration for disabling the rendering services for the ongoing playback. Some of the possibilities could be (but not limited to)

1. The user could have on-screen soft-key/button on the television 102a for disabling the rendering services within the playback screen for all the content sources including the preset screen. The soft-key/button could act as a toggle button so as to re-enable the rendering services
2. Universal remote controls could have key or soft-key in their user interface to disable/enable the rendering services
3. Controller devices 140a, 140b, 140c . . . could also have key or soft-key in their user interface to disable/enable the rendering services. It could be possible that such key could have no action on disabling/enabling or soft-key could be greyed out and made uncontrollable whenever the television disables the service for a particular controller device
4. User could have a default setting of the duration for which rendering services could be disabled
5. In case the current playback program is linked to the EPG information then the disabling could automatically be over once the program is finished as per the EPG data. In case the user changes the channel/preset while the rendering services are disabled then it could be linked to the EPG information of the current tuned pre-set
6. In case there is no EPG information for the current tuned channel/pre-set, then the duration could be guided by the default settings
7. User could also have a setting to automatically enable the rendering services when the playback of a particular content is completed In a still further embodiment, each controller device 140a, 140b, 140c . . . 140n could transmit unique identification information to the television 102a thereby facilitating temporary disabling of the rendering service on the corresponding controller device.

It could be possible to uniquely identify a controller device within the home network. This unique identification information could be incorporated in various ways. One option could be that the controller device is configured to convey the unique identification information to the television while sending any UPnP Audio/Video Transport or Rendering Control Service action. A few further options of implementing this could be:

1. Unique identification information could be part of existing HTTP user agent field within the HTTP request
2. Unique identification information could be part of a new argument name within the argument list for all the actions within Simple Object Access Protocol (SOAP) envelope body
3. Unique identification information could be part of a new parameter within the action name tag within Simple Object Access Protocol (SOAP) envelope body The unique identification information associated with a controller device inturn could be made of one or more data associated with the controller device namely 1. MAC Address (preferred as it is unique for each controller device within the home network)
2. Application name (only preferred when there could be multiple controller applications running on the same controller device) and Application instance id (only needed where there could be multiple instances of same controller application running on the same controller device)
3. Device type/class (preferred as it could give more information about the controller device to the television)
4. Friendly name (preferred as it is more user friendly way for the television to remember about a controller device)
5. IP address (not preferred as it could change within the home network)

In a still further embodiment, powering on the television 102a could enable the temporarily disabled rendering services. Power ON/OFF need not necessarily mean ON/OFF of the media rendering device. ON/OFF could be only for the renderer component of the media rendering device which is a software. As an example, media rendering device ON/OFF could just be ON/OFF of an executable running on a PC. This allows further configurability. The user could also have the setting to automatically enable the rendering services when the playback is over for a particular content. Furthermore, the user could be presented an user interface on the television 102a to view the list of controller devices 140a, 140b, 140c, ... 140n within the home network. The user could be allowed to check/un-check disabling of the rendering services for each of the controller device.

Figure 3:
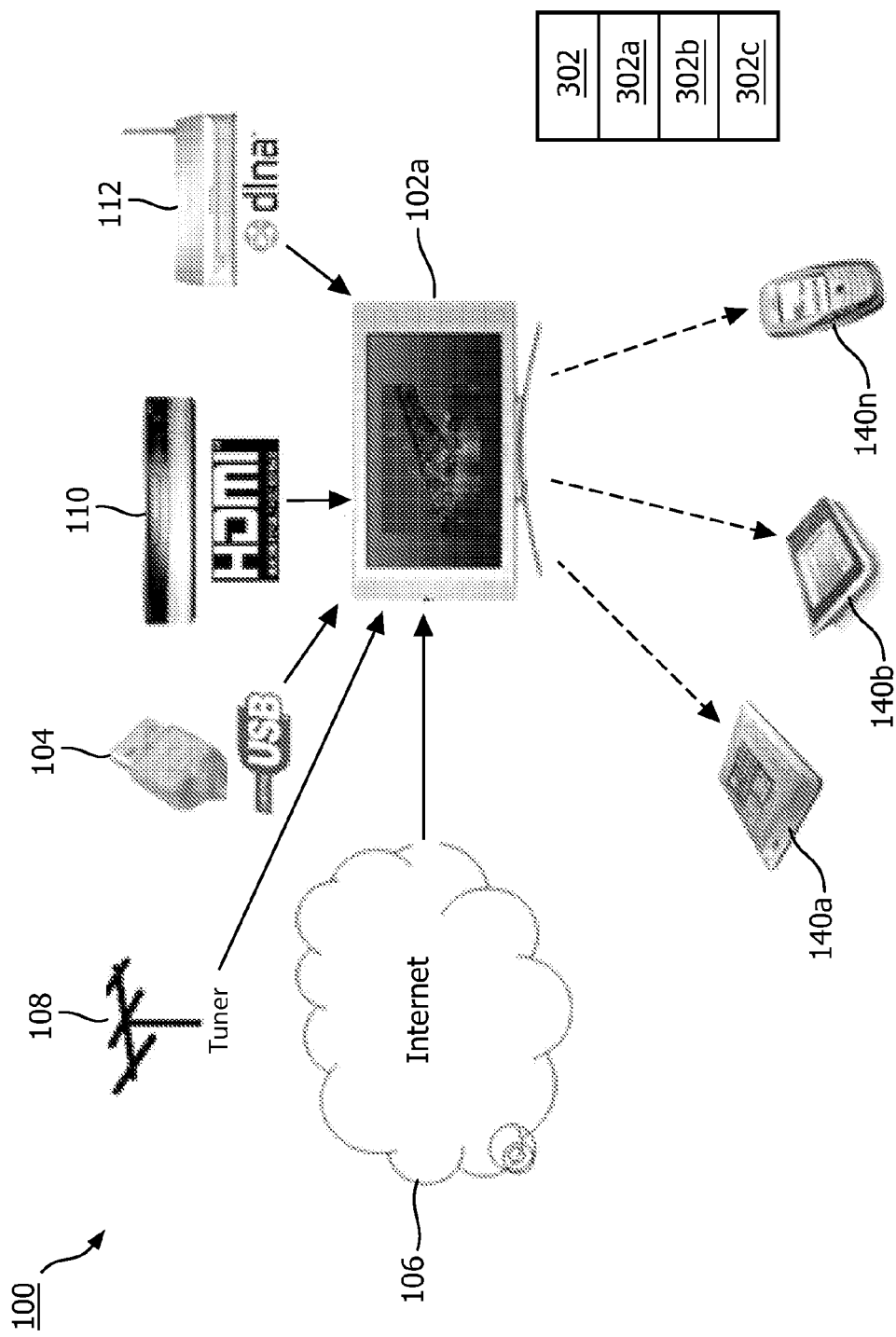
FIG. 3 schematically shows an exemplary logic unit for providing uninterrupted playback of content according to an embodiment of the present subject matter.

Referring now to FIG. 3, a logic unit 302 for providing uninterrupted playback of content being rendered by a media rendering device 102a in a home network 100 is disclosed. The media rendering device 102a is configured to render content available from a plurality of sources 104,106,108, 110,112. The logic unit 302 comprises:
 a retaining unit 302a for retaining the media rendering device 102a within the home network and checking whether the media rendering device is rendering content;
 a checking unit 302b for checking whether the media rendering device wants to continue its current ongoing rendering of content uninterruptedly; and
 a configuring unit 302c for configuring the media rendering device to notify the plurality of controller devices not to subscribe and invoke rendering service request thereby suspending the processing of rendering service request.

The logic unit 302 could be included in the media rendering device 102a itself instead of being part of the home network 100.

In summary, a method of providing uninterrupted playback of content being rendered by a media rendering device in a home network is disclosed. The method comprises retaining the media rendering device within the home network and checking whether the media rendering device is rendering content and if so checking whether the media rendering device wants to continue its current ongoing rendering of content uninterruptedly and if so configuring the media rendering device to notify the plurality of controller devices not to subscribe and invoke rendering service request thereby suspending the processing of rendering service request.

The disclosed subject matter is useful for media rendering devices within the home network. The media rendering devices could be connected televisions, streamium devices, connected photo frames, set-top boxes, mobile phones and personal computers/laptops. The disclosed subject matter is helpful for battery operated media rendering devices. The network traffic could be reduced by avoiding processing of events/notifications towards different controller devices which in turn could save power. The disclosed subject matter could also help the controller devices and renderer devices to save upon the processing power by avoiding the network traffic while the rendering services are disabled.

The disclosed subject matter could be extended to other domains such as lighting. As an exemplary situation, a light bulb can be considered as a light renderer. Four switches (S1, S2, S3 and S4) can be considered as light bulb controllers. A user may switch on the light bulb using one switch (S1) and would not want the light bulb to be switched off by others through other remaining switches (S2, S3 and S4). Hence, the user can set the light bulb to such a mode wherein it notifies the remaining switches (S2, S3 and S4) and further disables the switches S2, S3 and S4 from controlling the light bulb.

Furthermore, the embodiments describe UPnP/DLNA enabled devices, but the same concepts could be extended to non-DLNA/UPnP scenarios e.g., WiFi enabled mobile phones which can act as Universal Remote Controllers, Apple Controllers based on Bonjour.

While the subject matter has been illustrated in detail in the drawings and foregoing description, such illustration and description are to be considered illustrative or exemplary and not restrictive; the subject matter is not limited to the disclosed embodiments. Other variations to the disclosed embodiments can be understood and effected by those skilled in the art of practicing the claimed subject matter, from a study of the drawings, the disclosure and the appended claims. Use of the verb "comprise" and its conjugates does not exclude the presence of elements other than those stated in a claim or in the description. Use of the indefinite article "a" or "an" preceding an element or step does not exclude the presence of a plurality of such elements or steps. A single unit may fulfill the functions of several items recited in the claims. The mere fact that certain measures are recited in mutually different dependant claims does not indicate that a combination of these measures cannot be used to advantage. The figures and description are to be regarded as illustrative only and do not limit the subject matter. Any reference sign in the claims should not be construed as limiting the scope.

The invention claimed is:

1. A method of providing uninterrupted playback of content being rendered by a media rendering device in a home network, the media rendering device configured to render content available from a plurality of content sources, the home network having a plurality of controller devices to control the media rendering device, the method comprising:
 retaining the media rendering device within the home network and checking whether the media rendering device is rendering content, and if so
 checking whether the media rendering device wants to continue its current ongoing rendering of content uninterruptedly as preconfigured in said media rendering device, and if so
 configuring the media rendering device to notify the plurality of controller devices not to subscribe and invoke any rendering service request prior to any controller device invoking a rendering service request, thereby suspending the processing of rendering service request, wherein the media rendering device uses an event mechanism and notifies one or more controller devices that the processing of the rendering service request is temporarily disabled, thereby disallowing the controller device to subscribe for events associated with specific rendering service.

2. The method according to claim 1, wherein configuring the media rendering device further comprises at least one of:
 temporarily disabling the rendering service request associated with A/V playback controls of UPnP Audio/Video Transport service, temporarily disabling the rendering service request associated with UPnP Rendering Control Services, temporarily disabling the rendering service request associated with setting of a new URL within Audio/Video Transport service, and temporarily disabling the rendering service request associated with rendering of content from a pre-determined content source while the rendering is ongoing.

3. The method according to claim 1, wherein configuring the media rendering device further comprises:

temporarily disabling the processing of the rendering service request invoked by specific controller devices thereby allowing prioritization, the specific controller devices being at least one of:

controller device used by kids, controller device used by guests, controller device used by spouse.

4. The method according to claim 3, wherein configuring the media rendering device further comprises:

checking whether a rendering service request invoked by a first controller device has been processed and if so prioritizing the first controller device and temporarily disabling the processing of rendering service request invoked by controller devices other than the first controller device.

5. The method according to claim 1, wherein each controller device transmits unique identification information to the media rendering device thereby facilitating temporary disabling of the rendering service request on the corresponding controller device.

6. The method according to claim 1, wherein powering on the media rendering device enables the temporarily disabled rendering services.

7. A logic unit for providing uninterrupted playback of content being rendered by a media rendering device in a home network, the media rendering device configured to render content available from a plurality of sources, the logic unit comprising:

a retaining unit for retaining the media rendering device within the home network and checking whether the media rendering device is rendering content;

a checking unit for checking whether the media rendering device wants to continue its current ongoing rendering of content uninterruptedly as preconfigured in said media rendering device; and a configuring unit for configuring the media rendering device to notify the plurality of controller devices not to subscribe and invoke any rendering service request prior to any controller device invoking a rendering service request thereby suspending the processing of rendering service request, wherein the media rendering device uses an event mechanism and notifies one or more controller devices that the processing of the rendering service request is temporarily disabled, thereby disallowing the controller device to subscribe for events associated with specific rendering service.

8. A home network system comprising the logic unit as claimed in claim 7.

9. A non-transitory computer-readable medium encoded with a software program comprising executable codes for causing a processor to carry out the method in accordance with claim 1.

* * * * *